US010091326B2

(12) United States Patent
Rietveld et al.

(10) Patent No.: US 10,091,326 B2
(45) Date of Patent: Oct. 2, 2018

(54) MODIFYING CONTENT REGIONS OF A DIGITAL MAGAZINE BASED ON USER INTERACTION

(71) Applicant: Flipboard, Inc., Palo Alto, CA (US)

(72) Inventors: Mark Rietveld, Palo Alto, CA (US); Jing Zhao, Milpitas, CA (US); Didier Hilhorst, San Francisco, CA (US)

(73) Assignee: Flipboard, Inc., Palo Alto, CA (US)

( * ) Notice: Subject to any disclaimer, the term of this patent is extended or adjusted under 35 U.S.C. 154(b) by 276 days.

(21) Appl. No.: 14/626,906

(22) Filed: Feb. 19, 2015

(65) Prior Publication Data
US 2015/0244830 A1   Aug. 27, 2015

Related U.S. Application Data

(60) Provisional application No. 61/943,321, filed on Feb. 22, 2014.

(51) Int. Cl.
| G06F 3/0484 | (2013.01) |
| H04L 29/08 | (2006.01) |
| G06Q 10/10 | (2012.01) |
| G06F 17/30 | (2006.01) |

(52) U.S. Cl.
CPC ............ *H04L 67/306* (2013.01); *G06F 17/30* (2013.01); *G06F 17/30867* (2013.01); *G06Q 10/10* (2013.01)

(58) Field of Classification Search
CPC ....... G06F 3/033; G06F 3/0484; H04L 67/306
See application file for complete search history.

(56) References Cited

U.S. PATENT DOCUMENTS

| 7,028,264 | B2 * | 4/2006 | Santoro | G06F 3/0481 715/729 |
| 7,870,583 | B2 * | 1/2011 | Kim | H04N 5/44591 348/731 |
| 9,256,349 | B2 * | 2/2016 | Phillips | G06F 3/04817 |
| 2007/0294238 | A1 * | 12/2007 | Citron | G06F 17/248 |
| 2009/0100462 | A1 * | 4/2009 | Park | G06F 17/30849 725/38 |
| 2009/0113352 | A1 * | 4/2009 | Gotcher | G06F 3/04817 715/854 |
| 2009/0198359 | A1 * | 8/2009 | Chaudhri | G06F 3/0482 700/94 |

(Continued)

*Primary Examiner* — Dino Kujundzic
(74) *Attorney, Agent, or Firm* — Fenwick & West LLP

(57) ABSTRACT

A digital magazine application executing on a client device presents content retrieved from various sources to a user by presenting content regions that are each associated with various content items. When the digital magazine application identifies a type of interaction with a content region, the content region is modified to present information about various content items associated with the content region. For example, if the digital magazine application determines that a user positions a pointer at least a threshold distance from a surface of a display device for at least a threshold length of time at a location along a length and along a width of a display device where a content region is presented, the content region is modified. For example, the content region is increased in size and information describing content items associated with the content region is presented.

14 Claims, 4 Drawing Sheets

(56) References Cited

U.S. PATENT DOCUMENTS

| | | | |
|---|---|---|---|
| 2010/0058388 A1* | 3/2010 | Baba | H04N 5/44543 725/40 |
| 2010/0138767 A1* | 6/2010 | Wang | G06F 3/0481 715/769 |
| 2011/0099514 A1* | 4/2011 | Singhal | G06F 3/0482 715/809 |
| 2012/0054778 A1* | 3/2012 | Russell | G06F 3/0481 719/328 |
| 2012/0110454 A1* | 5/2012 | Chae | G06F 3/0482 715/716 |
| 2012/0120002 A1* | 5/2012 | Ota | G06F 3/0488 345/173 |
| 2012/0159314 A1* | 6/2012 | Schrier | G06F 17/30905 715/252 |
| 2013/0024757 A1 | 1/2013 | Doll et al. | |
| 2014/0047380 A1* | 2/2014 | Mak | G06F 3/041 715/800 |
| 2014/0074863 A1 | 3/2014 | Walkingshaw et al. | |
| 2015/0019943 A1 | 1/2015 | Ying et al. | |
| 2015/0019957 A1 | 1/2015 | Ying et al. | |
| 2015/0019958 A1 | 1/2015 | Ying et al. | |
| 2015/0213492 A1 | 7/2015 | Aleksandrovsky | |

* cited by examiner

MODIFYING CONTENT REGIONS OF A DIGITAL MAGAZINE BASED ON USER INTERACTION

CROSS REFERENCE TO RELATED APPLICATIONS

This application claims the benefit of U.S. Provisional Application No. 61/943,321, filed on Feb. 22, 2014, which is incorporated by reference in its entirety.

BACKGROUND

This invention generally relates to presenting content to a user via a digital magazine, and more specifically to modifying presentation of content regions of a digital magazine based on user interaction with the content region.

A digital magazine server provides content to its users as a digital magazine including various pages each having content regions arranged in positions relative to each other. One or more content items may be presented in each content region. Frequently, an application associated with the digital magazine server and executing on a client device provides a digital magazine to a digital magazine sever user. The user may access various content items in the digital magazine by interacting with content regions of the digital magazine presented by the client device. However, many conventional digital magazines provide a user with limited information about content items associated with a content region, providing the user with incomplete information for determining if content items associated with the content region are likely to be of interest to the user.

SUMMARY

A digital magazine server retrieves content from one or more sources and generates a personalized, customizable digital magazine for a user based on the retrieved content. The digital magazine server organizes content items having at least one common characteristic into various sections based on page templates describing the relative positioning of content items or content regions to each other. The content regions are presented to the user according to the sections.

The digital magazine server may maintain page templates specifying the relative positioning and sizing of content regions each associated with one or more content items to a user via a client device. Additionally, the client device includes one or more input devices for receiving interactions from the user. In some implementations, the input device is a touch-sensitive display device.

To allow a user to more easily navigate through content items included in a digital magazine, a digital magazine application executing on a client device modifies a content region including one or more content items when a type of user interaction with the content region is received. In one embodiment, when a user positions a pointer (e.g., a stylus, the user's finger, etc.) within a threshold distance of a location of a display device presenting a content region for at least a threshold length of time, the digital magazine application modifies the content region to present additional content items or additional information associated with content items presented by the content region. Alternatively, if the user moves a pointer toward the surface of the display device at a location associated with a presented content region with at least a threshold rate, the content region is modified to present additional information about content items associated with the content region. For example, a location along a width of the display device (or an input device) and a location along a length of the display device (or he input device) is identified and the pointer's position from the surface of the display device (or the input device) at the determined location along the length and location along the width is determined. If the pointer's position from the surface of the display device at the determined locations along the length and the width is within a threshold distance of the surface of the display device (or the input device) for at least a threshold length of time, the digital magazine application identifies a content region associated with the location along the length and the location along the width and modifies presentation of the identified content region.

For example, the digital magazine application retrieves content items associated with the identified content region and identifies candidate content items for presentation based on one or attributes associated with various retrieved content items. One or more candidate content items are selected for presentation from the candidate content items by the digital magazine application. The digital magazine application modifies the identified content region and presents information associated with one or more of the selected candidate content items in the modified identified content region. For example, the identified content region is resized to occupy a larger portion of the display device. In some embodiments, the identified content region may also be repositioned to a different location in the display device to make the identified content region more visible. In some embodiments, one or more content regions adjacent to the identified content region are also modified (e.g., reduced in size, obscured, etc.) to further distinguish the identified content region from other content regions. Hence, the identified content region is modified to be more visible to a user and to include information associated with various content items associated with the identified content region (e.g., the titles of candidate content items), such as content items associated with the identified content region but not initially presented via the content region.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A digital magazine server retrieves content from one or more sources and generates a personalized, customizable digital magazine for a user based on the retrieved content. The generated digital magazine is retrieved by a digital magazine application executing on a computing device (such as a mobile communication device, tablet, computer, or any other suitable computing system) and presented to the user. For example, based on selections made by the user and/or on behalf of the user, the digital server application generates a digital magazine including one or more sections including content items retrieved from a number of sources and personalized for the user. The generated digital magazine allows the user to more easily consume content that interests and inspires the user by presenting content items in an easily navigable interface via a computing device.

The digital magazine may be organized into a number of sections that each include content having a common characteristic (e.g., content obtained from a particular source). For example, a section of the digital magazine includes articles from an online news source (such as a website for a news organization), another section includes articles from a third-party-curated collection of content associated with a particular topic (e.g., a technology compilation), and an additional section includes content obtained from one or more accounts associated with the user and maintained by one or more social networking systems. For purposes of illustration, content included in a section is referred to herein as "content items" or "articles," which may include textual articles, pictures, videos, products for sale, user-generated content (e.g., content posted on a social networking system), advertisements, and any other types of content capable of display within the context of a digital magazine.

System Architecture

Figure 1:
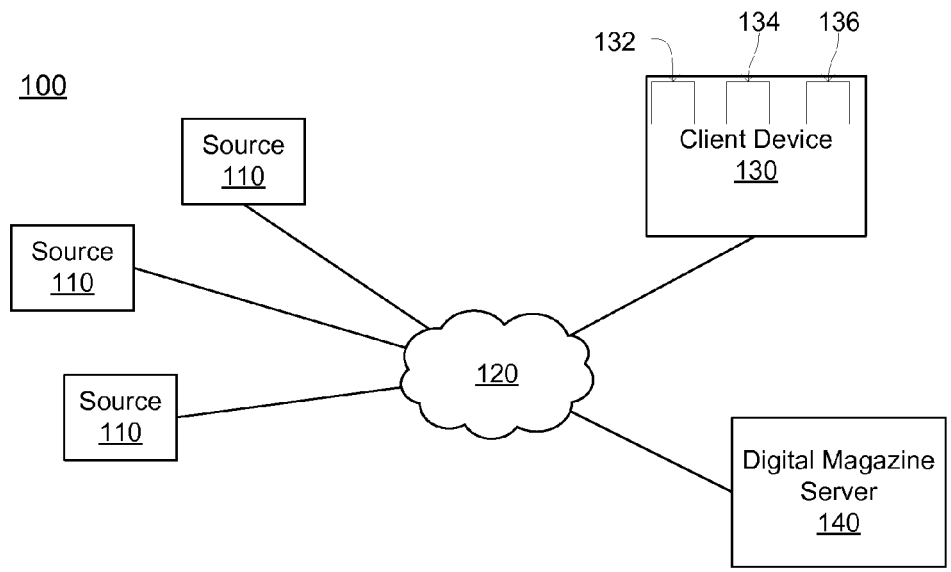
FIG. 1 is a block diagram of a system environment in which a digital magazine server operates, in accordance with an embodiment of the invention.

FIG. 1 is a block diagram of a system environment 100 for a digital magazine server 140. The system environment 100 shown by FIG. 1 comprises one or more sources 110, a network 120, a client device 130, and the digital magazine server 140. In alternative configurations, different and/or additional components may be included in the system environment 100. The embodiments described herein can be adapted to online systems that are not digital magazine severs 140.

A source 110 is a computing system capable of providing various types of content to a client device 130. Examples of content provided by a source 110 include text, images, video, or audio on web pages, web feeds, social networking information, messages, or other suitable data. Additional examples of content include user-generated content such as blogs, tweets, shared images, video or audio, social networking posts, and social networking status updates. Content provided by a source 110 may be received from a publisher (e.g., stories about news events, product information, entertainment, or educational material) and distributed by the source 110, or a source 110 may be a publisher of content it generates. For convenience, content from a source, regardless of its composition, may be referred to herein as an "article," a "content item," or as "content." A content item may include various types of content, such as text, images, and video.

The sources 110 communicate with the client device 130 and the digital magazine server 140 via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) extensible markup language (XML) or JavaScript Object Notation (JSON). In some embodiments, all or some of the communication links of the network 120 may be encrypted using any suitable technique or techniques.

The client device 130 is one or more computing devices capable of receiving user input as well as transmitting and/or receiving data via the network 120. In one embodiment, the client device 130 is a conventional computer system, such as a desktop or a laptop computer. Alternatively, the client device 130 may be a device having computer functionality, such as a personal digital assistant (PDA), a mobile telephone, a smartphone or another suitable device. In one embodiment, the client device 130 executes an application allowing a user of the client device 130 to interact with the digital magazine server 140. For example, an application executing on the client device 130 communicates instructions or requests for content items to the digital magazine server 140 to modify content presented to a user of the client device 130. As another example, the client device 130 executes a browser that receives pages from the digital magazine server 140 and presents the pages to a user of the client device 130. In another embodiment, the client device 130 interacts with the digital magazine server 140 through an application programming interface (API) running on a native operating system of the client device 130, such as IOS® or ANDROID™. While FIG. 1 shows a single client device 130, in various embodiments, any number of client devices 130 may communicate with the digital magazine server 140.

A display device 132 included in the client device 130 presents content items to a user of the client device 130. Examples of the display device 132 include a liquid crystal display (LCD), an organic light emitting diode (OLED) display, an active matrix liquid crystal display (AMLCD), or any other suitable device. Different client devices 130 may have display devices 132 with different characteristics. For example, different client devices 132 have display devices 132 with different display areas, different resolutions, or differences in other characteristics.

One or more input devices 134 included in the client device 130 receive input from the user. Different input devices 134 may be included in the client device 130. For example, the client device 130 includes a touch-sensitive display for receiving input data, commands, or information from a user. Using a touch-sensitive display allows the client device 130 to combine the display device 132 and an input device 134, simplifying user interaction with presented content items. In other embodiments, the client device 130 may include a keyboard, a trackpad, a mouse, or any other device capable of receiving input from a user. In another example, the input device 134 is configured to receive information from a user of the client device through a touchless interface. Examples of a touchless interface include sensors, such as an image capture device, to receive gestures from a client device user without the user physically contacting the display device 132 or the client device 130. Additionally, the client device may include multiple input devices 134 in some embodiments. Inputs received via the input device 134 may be processed by a digital magazine application 136 associated with the digital magazine server 140 and executing on the client device 130 to allow a client device user to interact with content items presented by the digital magazine server 140.

In one embodiment, an input device 134, such as a touch-sensitive display receives input data identifying a position of a pointer on the display device 132 as well as a distance between the pointer and a surface of the display device 132. Examples of a pointer include a stylus, a user's finger, or any other component suitable for interacting with an input device 134 (e.g., a touch-sensitive surface of the display device 132). The input device 134 may generate information describing a position of the pointer along multiple axes determined from the display device; for example, information describing a position of the pointer along an axis across the width of the input device 134, a position of the pointer along an axis across a length of the input device 134, and a position of the pointer along an axis perpendicular to a surface of the input device 134 are determined. In one embodiment, the input device 134 is a capacitive touch-sensitive display, the capacitive touch-display measures a voltage change based on a distance between a pointer and a surface of the input device 134, allowing the input device 134 to determine a position of the pointer along an axis perpendicular to the surface of the input device 134. For example, the touch-sensitive display identifies a distance of a pointer relative to a top left corner of the touch-sensitive display, along the width of the touch-sensitive display (i.e., an x-axis of the touch-sensitive display) and along the length of the touch-sensitive display (i.e., a y-axis of the touch-sensitive display) to specify a location (e.g., x and y co-ordinates) of the pointer on the surface of the touch-sensitive display. Additionally, the input device 134 (e.g., a touch-sensitive display) may generate a z-axis value that specifies a distance of the pointer from the surface of the touch-sensitive display at the location along the length and width of the touch-sensitive display based on a change in voltage value measured the identified location along the length and width of the input device 134. In one embodiment, the digital magazine application 136 receives coordinates identifying the location of the pointer along the length and width of the input device 134 as well as a coordinate specifying a distance of the pointer relative to a surface of the input device 134 and modifies the information presented to a user of the client device 130 based on the received coordinates.

The digital magazine server 140 receives content items from one or more sources 110, generates pages in a digital magazine by processing the received content, and provides the pages to the client device 130. As further described below in conjunction with FIG. 2, the digital magazine server 140 generates one or more pages for presentation to a user based on content items obtained from one or more sources 110 and information describing organization and presentation of content items. For example, the digital magazine server 140 determines a page layout specifying positioning of content items relative to each other based on information associated with a user and generates a page including the content items arranged according to the determined layout for presentation to the user via the client device 130. This allows the user to access content items via the client device 130 in a format that enhances the user's interaction with and consumption of the content items. For example, the digital magazine server 140 provides a user with content items in a format similar to the format used by print magazines. By presenting content items in a format similar to a print magazine, the digital magazine server 140 allows a user to interact with content items from multiple sources 110 via the client device 130 with less inconvenience from horizontally or vertically scrolling to access various content items.

Figure 2:
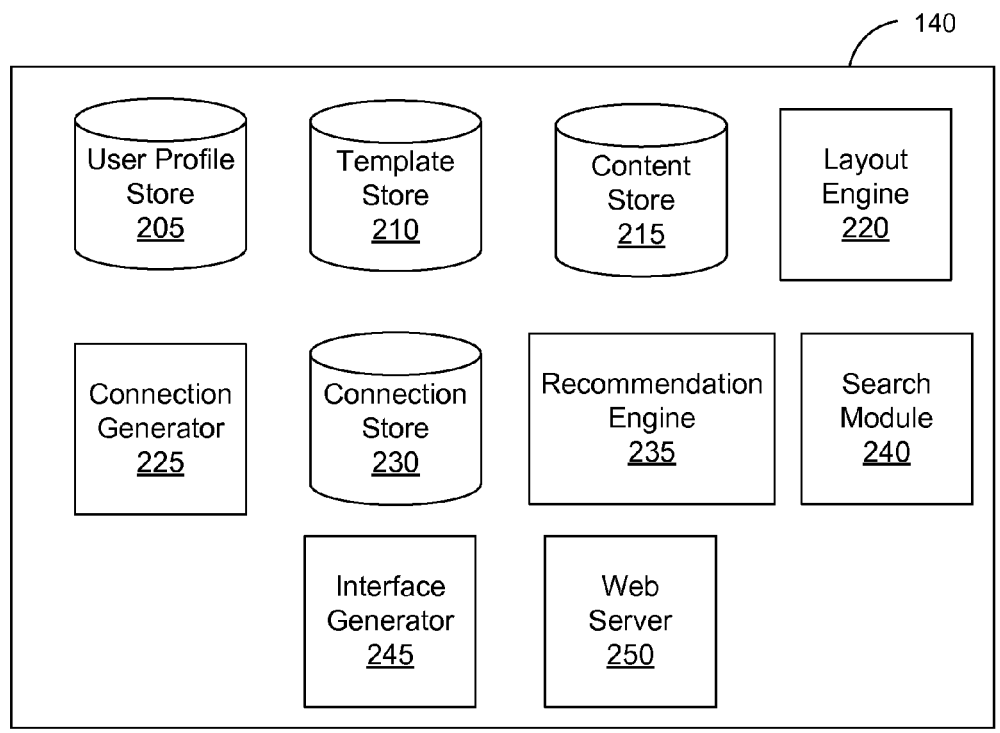
FIG. 2 is a block diagram of a digital magazine server, in accordance with an embodiment of the invention.

FIG. 2 is a block diagram of an architecture of the digital magazine server 140. The digital magazine server 140 shown in FIG. 2 includes a user profile store 205, a template store 210, a content store 215, a layout engine 220, a connection generator 225, a connection store 230, a recommendation engine 235, a search module 240, an interface generator 245, and a web server 250. In other embodiments, the digital magazine server 140 may include additional, fewer, or different components for various applications. Conventional components such as network interfaces, security functions, load balancers, failover servers, management and network operations consoles, and the like are not shown so as to not obscure the details of the system architecture.

Each user of the digital magazine server 140 is associated with a user profile, which is stored in the user profile store 205. A user profile includes declarative information about the user that was explicitly shared by the user and may also include profile information inferred by the digital magazine server 140. In one embodiment, a user profile includes multiple data fields, each describing one or more attributes of the corresponding social networking system user. Examples of information stored in a user profile include biographic, demographic, and other types of descriptive information, such as gender, hobbies or preferences, location, or other suitable information. A user profile in the user profile store 205 also includes data describing interactions by a corresponding user with content items presented by the digital magazine server 140. For example, a user profile includes a content item identifier, a description of an interaction with the content item corresponding to the content item identifier, and a time when the interaction occurred.

While user profiles in the user profile store 205 are frequently associated with individuals, allowing individuals to provide and receive content items via the digital magazine server 140, user profiles may also be stored for entities such as businesses or organizations. This allows an entity to provide or access content items via the digital magazine server 140. An entity may post information about itself, about its products or provide other content items associated with the entity to users of the digital magazine server 140. For example, users of the digital magazine server 140 may receive a digital magazine or section including content items associated with an entity via the digital magazine server 140.

The template store 210 includes page templates each describing a spatial arrangement ("layout") of content items relative to each other on a page for presentation by a client device 130. A page template includes one or more slots, each configured to present one or more content items. In some embodiments, slots in a page template may be configured to present a particular type of content item or to present a content item having one or more specified characteristics. For example, a slot in a page template is configured to present an image while another slot in the page template is configured to present text data. Each slot has a size (e.g., small, medium, or large) and an aspect ratio. One or more page templates may be associated with types of client devices 130, allowing content items to be presented in different relative locations and with different sizes when the content items are viewed using different client devices 130.

Additionally, page templates may be associated with sources 110, allowing a source 110 to specify the format of pages presenting content items received from the source 110. For example, an online retailer is associated with a page template to allow the online retailer to present content items via the digital magazine server 140 with a specific organization. Examples of page templates are further described in U.S. patent application Ser. No. 13/187,840, filed on Jul. 21, 2011, and U.S. patent application Ser. No. 13/938,227, filed on Jul. 9, 2103, each of which is hereby incorporated by reference in its entirety.

The content store 215 stores objects that each represent various types of content. For example, the content store 215 stores content items received from one or more sources 115 within a threshold time of a current time. Examples of content items stored by the content store 215 include a page post, a status update, a photograph, a video, a link, an article, video data, audio data, a check-in event at a location, or any other type of content. A user may specify a section including content items having a common characteristic, and the common characteristic is stored in the content 215 store along with an association with the user profile or the user specifying the section.

The layout engine 220 retrieves content items from one or more sources 110 or from the content store 215 and generates a page including the content items based on a page template from the template store 210. Based on the retrieved content items, the layout engine 220 may identify candidate page templates from the template store 210, score the candidate page templates based on characteristics of the slots in different candidate page templates and based on characteristics of the content items. Based on the scores associated with candidate page templates, the layout engine 220 selects a page template and associates the retrieved content items with one or more slots to generate a page where the retrieved content items are presented relative to each other and sized based on their associated slots. When associating a content item with a slot, the layout engine 220 may associate the content item with a slot configured to present a specific type of content item or to present content items having one or more specified characteristics. Examples of using a page template to present content items are further described in U.S. patent application Ser. No. 13/187,840, filed on Jul. 21, 2011, U.S. patent application Ser. No. 13/938,223, filed on Jul. 9, 2013, and U.S. patent application Ser. No. 13/938,226, filed on Jul. 9, 2013, each of which is hereby incorporated by reference in its entirety.

The connection generator 225 monitors interactions between users and content items presented by the digital magazine server 140. Based on the interactions, the connection generator 225 determines connections between various content items, connections between users and content items, or connections between users of the digital magazine server 140. For example, the connection generator 225 identifies when users of the digital magazine server 140 provide feedback about a content item, access a content item, share a content item with other users, or perform other actions with content items. In some embodiments, the connection generator 225 retrieves data describing user interaction with content items from the user's user profile in the user profile store 205. Alternatively, user interactions with content items are communicated to the connection generator 225 when the interactions are received by the digital magazine server 140. The connection generator 225 may account for temporal information associated with user interactions with content items. For example, the connection generator 225 identifies user interactions with a content item within a specified time interval or applies a decay factor to identified user interactions based on times associated with interactions. The connection generator 225 generates a connection between a user and a content item if the user's interactions with the content item satisfy one or more criteria. In one embodiment, the connection generator 225 determines one or more weights specifying a strength of the connection between the user and the content item based on user interactions with the content item that satisfy one or more criteria. Generation of connections between a user and a content item is further described in U.S. patent application Ser. No. 13/905,016, filed on May 29, 2013, which is hereby incorporated by reference in its entirety.

If multiple content items are connected to a user, the connection generator 225 establishes implicit connections between each of the content items connected to the user. In one embodiment, the connection generator 225 maintains a user content graph identifying the implicit connections between content items connected to a user. In one embodiment, weights associated with connections between a user and content items are used to determine weights associated with various implicit connections between content items. User content graphs for multiple users of the digital magazine server 140 are combined to generate a global content graph describing connections between various content items provided by the digital magazine server 140 based on user interactions with various content items. For example, the global content graph is generated by combining user content graphs based on mutual connections between various content items in user content graphs.

In one embodiment, the connection generator 225 generates an adjacency matrix from the global content graph or from multiple user content graphs and stores the adjacency matrix in the connection store 230. The adjacency matrix describes connections between content items. For example, the adjacency matrix includes identifiers of content items and weights representing the strength or closeness of connections between content items based on the global content graph. As an example, the weights indicate a degree of similarity in subject matter or similarity of other characteristics associated with various content items. In other embodiments, the connection store 230 includes various adjacency matrices determined from various user content graphs; the adjacency matrices may be analyzed to generate an overall adjacency matrix for content items provided by the digital magazine server 140. Graph analysis techniques may be applied to the adjacency matrix to rank content items, to recommend content items to a user, or to otherwise analyze relationships between content items. An example of the adjacency matrix is further described in U.S. patent application Ser. No. 13/905,016, filed on May 29, 2013, which is hereby incorporated by reference in its entirety.

In addition to identifying connections between content items, the connection generator 225 may also determine a social proximity between users of the digital magazine server 140 based on interactions between users and content items. The digital magazine server 140 determines social proximity, or "social distance," between users using a variety of techniques. For example, the digital magazine server 140 analyzes additional users connected to each of two users of the digital magazine server 140 within a social networking system to determine the social proximity of the two users. In another example, the digital magazine server 140 determines social proximity between a user and an additional user by analyzing the user's interactions with content items posted by the additional user, whether the content items are presented using the digital magazine server 140 or using another social networking system. Additional examples for determining social proximity between users of the digital magazine server 140 are described in U.S. patent application Ser. No. 13/905,016, filed on May 29, 2013, which is incorporated by reference in its entirety. In one embodiment, the connection generator 225 determines a connection confidence value between a user and an additional user of the digital magazine server 140 based on the user's and the additional user's common interactions with particular content items. The connection confidence value may be a numerical score representing a measure of closeness between the user and the additional user. For example, a larger connection confidence value indicates a greater similarity between the user and the additional user. In one embodiment, if a user has at least a threshold connection confidence value with another user, the digital magazine server 140 stores a connection between the user and the additional user in the connection store 230.

Using data from the connection store 230, the recommendation engine 235 identifies content items from one or more sources 110 for recommending to a digital magazine server user. Hence, the recommendation engine 235 identifies content items potentially relevant to a user. In one embodiment, the recommendation engine 235 retrieves data describing interactions between a user and content items from the user's user profile and data describing connections between content items, and/or connections between users from the connection store 230. In one embodiment, the recommendation engine 235 uses stored information describing content items (e.g., topic, sections, subsections) and interactions between users and various content items (e.g., views, shares, saved, links, topics read, or recent activities) to identify content items that may be relevant to a digital magazine server user. For example, content items having an implicit connection of at least a threshold weight to a content item with which the user interacted are recommended to the user. As another example, the recommendation engine 235 presents a user with content items having one or more attributes in common with a content item with which an additional user having a threshold connection confidence score with the user interacted. Recommendations for additional content items may be presented to a user when the user views a content item using the digital magazine, may be presented as a notification to the user by the digital magazine server 140, or may be presented to the user through any suitable communication channel.

In one embodiment, the recommendation engine 235 applies various filters to content items received from one or more sources 110 or from the content store 215 to efficiently provide a user with recommended content items. For example, the recommendation engine 235 analyzes attributes of content items in view of characteristics of a user retrieved from the user's user profile. Examples of attributes of content items include a type (e.g., image, story, link, video, audio, etc.), a source 110 from which a content item was received, time when a content item was retrieved, and subject matter of a content item. Examples of characteristics of a user include biographic information about the user, users connected to the user, and interactions between the user and content items. In one embodiment, the recommendation engine 235 analyzes attributes of content items in view of a user's characteristics for a specified time period to generate a set of recommended content items. The set of recommended content items may be presented to the user or may be further analyzed based on user characteristics and on content item attributes to generate more refined set of recommended content items. A setting included in a user's user profile may specify a length of time that content items are analyzed before identifying recommended content items to the user, allowing a user to balance refinement of recommended content items with time used to identify recommended content items.

The search module 240 receives a search query from a user and retrieves content items from one or more sources 110 based on the search query. For example, content items having at least a portion of an attribute matching at least a portion search query are retrieved from one or more sources 110. The user may specify sources 110 from which content items are received through settings maintained by the user's user profile or by identifying one or more sources in the search query. In one embodiment, the search module 240 generates a section of the digital magazine including the content items identified based on the search query, as the identified content items have a common attribute of their association with the search query. Presenting identified content items identified from a search query allows a user to more easily identify additional content items at least partially matching the search query when additional content items are provided by sources 110.

To more efficiently identify content items based on search queries, the search module 240 may index content items, groups (or sections) of content items, and user profile information. In one embodiment, the index includes information about various content items, such as author, source, topic, creation data/time, user interaction information, document title, or other information capable of uniquely identifying the content item. Search queries are compared to information maintained in the index to identify content items for presentation to a user. The search module 240 may present identified content items based on a ranking. One or more factors associated with the content items may be used to generate the ranking Examples of factors include: global popularity of a content item among users of the digital magazine server 140, connections between users interacting with a content item and the user providing the search query, and information from a source 110. Additionally, the search module 240 may assign a weight to the index information associated with each content item selected based on similarity between the index information and a search query and rank the content items based on their weights. For example, content items identified based on a search query are presented in a section of the digital magazine in an order based in part on the ranking of the content items.

To increase user interaction with the digital magazine, the interface generator 245 maintains instructions associating received input with actions performed by the digital magazine server 140 or by a digital magazine application 136 executing on a client device 130. For example, instructions maintained by the interface generator 245 associate types of inputs or specific inputs received via an input device 132 of a client device 130 with modifications to content presented by a digital magazine. For example, if the input device 134 is a touch-sensitive display, the interface generator 245 includes instructions associating different gestures with navigation through content items presented via a digital magazine. In another example, if the input device 134 is a touch-sensitive display, the interface generator 245 includes instructions that are communicated to a digital magazine application 136 executing on a client device 130 for modifying content items presented via the digital magazine application 136, based on a value indicating a distance of a pointer from a surface of an input device 134 of the client device 110. The instructions communicated to the client device 130 may include information for resizing or modifying content items or regions in which content items are displayed by the digital magazine application 136 based on length of time a pointer has at least a threshold distance from the surface of the input device 134 while at a specific location along a length and a width of the input device 134. In one embodiment, if the pointer has at least the threshold distance from the surface of the input device 134 at a location along a length and a width of the input device 134, content presented by the digital magazine application 136 at the location along the length and the width of the input device 134 is modified. Additionally, the instructions may include information for generating a value specifying a distance of the pointer from the surface of the input device 134 at a location along a length and a width of the input device 134 based on a change in voltage at the location along the length and the width by the input device 134. Instructions from the interface generator 245 are communicated to a digital magazine application 136 or other application executing on a client device 130 on which content from the digital magazine server 140 is presented. Inputs received via an input device 134 of the client device 130 are processed based on the instructions when content items are presented via the digital magazine server 140 or the digital magazine application 136 is presented to simplify user interaction with content presented by the digital magazine server 140 or the digital magazine application 136.

The web server 250 links the digital magazine server 140 via the network 120 to the one or more client devices 130, as well as to the one or more sources 110. The web server 250 serves web pages, as well as other content, such as JAVA®, FLASH®, XML and so forth. The web server 250 may retrieve content item from one or more sources 110. Additionally, the web server 250 communicates instructions for generating pages of content items from the layout engine 220 and instructions for processing received input from the interface generator 245 to a client device 130 for presentation to a user. The web server 250 also receives requests for content or other information from a client device 130 and communicates the request or information to components of the digital magazine server 140 to perform corresponding actions. Additionally, the web server 250 may provide application programming interface (API) functionality to send data directly to native client device operating systems, such as IOS®, ANDROID™, WEBOS®, or BlackberryOS.

For purposes of illustration, FIG. 2 describes various functionalities provided by the digital magazine server 140. However, in other embodiments, the above-described functionality may be provided by a digital magazine application executing on a client device 130, or may be provided by a combination of the digital magazine server 140 and a digital magazine application executing on a client device 130. For example, the digital magazine server 140 communicates instructions to a digital magazine application 136 executing on a client device to determine a distance of a pointer from a surface of an input device 134, or a display device 132, of the client device 130 and to modify content presented by the digital magazine application 136 based on the determined distance of the pointer from the surface of the input device 134, or a display device 132.

Page Templates

Figure 3:
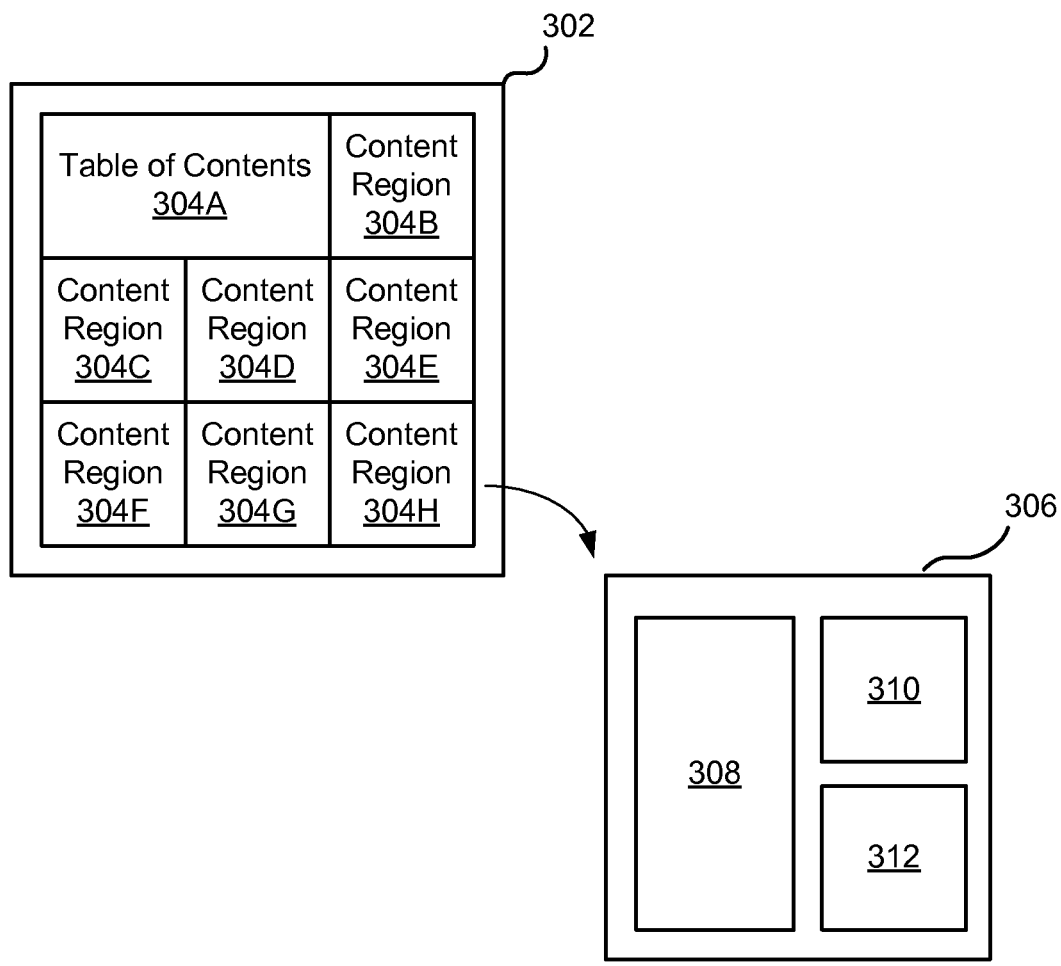
FIG. 3 is an example of presentation of content items in a digital magazine using a page template, in accordance with an embodiment of the invention.

FIG. 3 illustrates an example page template 302 having multiple rectangular slots each configured to present a content item. Other page templates with different configurations of slots may be used by the digital magazine server 140 to present one or more content items received from sources 110. As described above in conjunction with FIG. 2, in some embodiments, one or more slots in a page template are reserved for presentation of content items having specific characteristics or for presentation of a specific type of content item. In one embodiment, the size of a slot may be specified as a fixed aspect ratio or using fixed dimensions. Alternatively, the size of a slot may be flexible, where the aspect ratio or one or more dimensions of a slot is specified as a range, such as a percentage of a reference or a base dimension. Arrangement of slots within a page template may also be hierarchical. For example, a page template is organized hierarchically, where an arrangement of slots may be specified for the entire page template or for one or more portions of the page template.

In the example of FIG. 3, when a digital magazine server 140 generates a page for presentation to a user, the digital magazine server 140 populates slots in a page template 302 with content items. Information identifying the page template 302 and associations between content items and slots in the page template 302 is stored and used to generate the page. For example, to present a page to a user, the layout engine 220 identifies the page template 302 from the template store 210 and retrieves content items from one or more sources 110 or from the content store 215. The layout engine 220 generates data or instructions associating content items with slots within the page template 302. Hence, the generated page includes various "content regions" presenting one or more content items associated with a slot in a location specified by the slot.

A content region 304 may present image data, text, data, a combination of image and text data, or any other information retrieved from a corresponding content item. For example, in FIG. 3, the content region 304A represents a table of contents identifying sections of a digital magazine, and content associated with the various sections are presented in content regions 304B-304H. For example, content region 304A includes text or other data indicating that the presented data is a table of contents, such the text "Cover Stories Featuring," followed by one or more identifiers associated with various sections of the digital magazine. In one embodiment, an identifier associated with a section describes a characteristic common to at least a threshold number of content items in the section. For example, an identifier refers to the name of a user of social network from which content items included in the section are received. As another example, an identifier associated with a section specifies a topic, an author, a publisher (e.g., a newspaper, a magazine) or other characteristic associated with at least a threshold number of content items in the section. Additionally, an identifier associated with a section may further specify content items selected by a user of the digital magazine server 140 and organized as a section. Content items included in a section may be related topically and include text and/or images related to the topic.

Sections may be further organized into subsections, with content items associated with one or more subsections presented in content regions. Information describing sections or subsections, such as a characteristic common to content items in a section or subsection, may be stored in the content store 215 and associated with a user profile to simplify generation of a section or subsection for the user. A page template associated with a subsection may be identified, and slots in the page template associated with the subsection used to determine presentation of content items from the subsection relative to each other. Referring to FIG. 3, the content region 304H includes a content item associated with a newspaper to indicate a section including content items retrieved from the newspaper. When a user interacts with the content region 304, a page template associated with the section is retrieved, as well as content items associated with the section. Based on the page template associated with the section and the content items, the digital magazine server 140 generates a page presenting the content items based on the layout described by the slots of the page template. For example, in FIG. 3, the section page 306 includes content regions 308, 310, 312 presenting content items associated with the section. The content regions 308, 310, 312 may include content items associated with various subsections including content items having one or more common characteristics (e.g., topics, authors, etc.). Hence, a subsection may include one or more subsections, allowing hierarchical organization and presentation of content items by a digital magazine.

Figure 4:
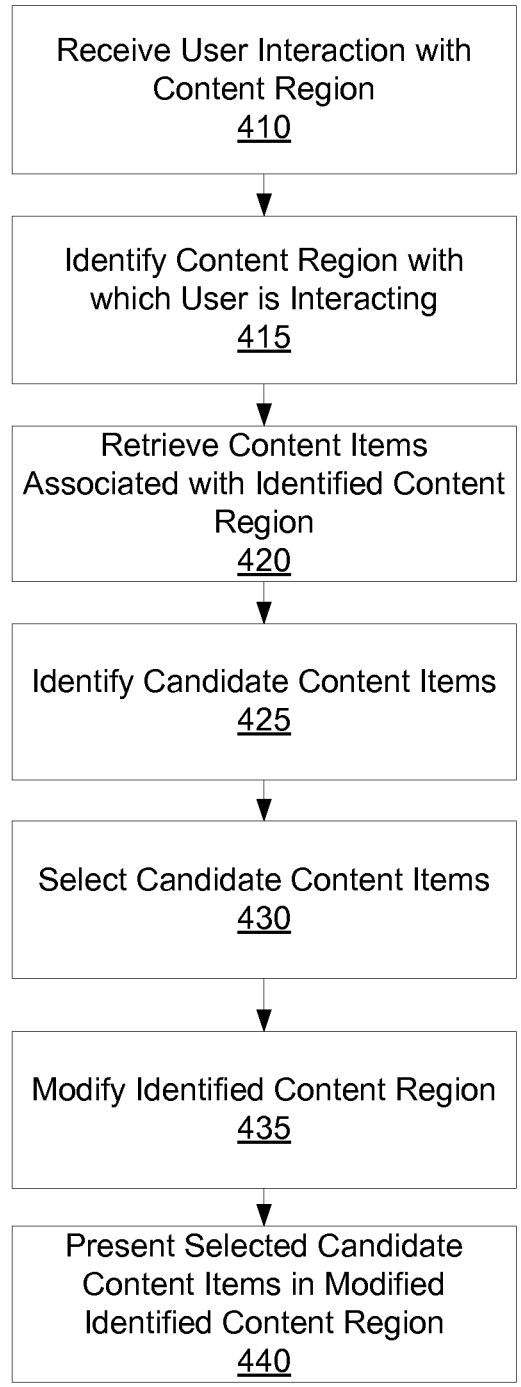
FIG. 4 shows a flowchart of a method for modifying presentation of content item based on a distance of a pointer from a surface of an input device 134 of a client device 130, in accordance with an embodiment of the invention.

Modifying Content Item Presentation Based on Distance from an Input Device Surface FIG. 4 shows a flowchart of one embodiment of a method for modifying presentation of content item based on a distance of a pointer from a surface of an input device 134 of a client device 130. In one embodiment, the functionality described in conjunction with FIG. 4 is performed by the digital magazine application 136; however, in other embodiments, any suitable component or combination of components may perform the functionality described in conjunction with FIG. 4. Additionally, in some embodiments, different and/or additional steps than those identified in FIG. 4 may be performed or the steps identified in FIG. 4 may be performed in different orders.

A user interacts with content items displayed to the user via the digital magazine application 136 executing on the client device 130. In one example, the digital magazine application 136 displays content items to a user of the client device 130 in one or more content regions presented via the display device 132. By interacting with a location of the display device 132 in which a content region is presented, the user interacts with the content items presented via the content region. In one embodiment, positioning a pointer within a threshold distance of a surface of the display device 132, or a surface of a input device 134, at a location where a content region is presented allows the user to interact with one or more content items presented via the content region.

The digital magazine application 136 executing on the client device 130 receives 410 an interaction from the user with a content region via the display device 132 or via the input device 134. In various embodiments, the interaction is received 410 when the user positions a pointer within a threshold distance of a surface of the display device 132 or of the input device 134 at a location where the content region is presented. For example, the digital magazine application 136 receives 410 the interaction when a pointer is positioned within a threshold distance of the surface of the input device 134 or the display device 132 for at least a threshold length of time. Alternatively, the digital magazine application 136 receives 410 the interaction when the input device 134 determines the pointer approaches the surface of the input device 134 with at least a threshold velocity. As described above in conjunction with FIG. 1, the input device 134 may be a capacitive touch screen, and the distance between the pointer and the surface of the input device 134 is determined based on a voltage change proportional to a distance between the pointer and the surface of the input device 134.

The digital magazine application identifies 415 a content region associated with the received interaction. In various embodiments, the digital magazine application determines a location along a length of the input device 134 or the display device 132 and a location along a width of the input device 134 or the display device where the input was received and identifies 415 a content region presented in the location along the length of the input device 134 or the display device 132 and the location along the width of the input device 134 or the display device 132. The content region may be identified 415 as a content region presented within a threshold distance of the location along the length of the input device 134 or the display device 132 and the location along the width of the input device 134 or the display device 132 where the interaction was received 410. For example, a content region presented in a region of the display device 134 including the location along the length of the input device 134 or the display device 132 and the location along the width of the input device 134 or the display device 132 is identified 415.

Hence, the digital magazine application 136 identifies 415 a content region presented in a location of the display device 132 corresponding to a location where the input is received 410. For example, the digital magazine application 136 identifies 415 a content region presented in a location of the display device 132 where the pointer is positioned within a threshold distance of a surface for the display device 132 for at least a threshold time interval. This allows the digital magazine application 136 to identifier 415 a content region associated with the received interaction when a pointer is positioned within a threshold distance of a surface of the display device 132 or the input device 134 or when the pointer approaches the surface of the display device 132 or the input device 134 with at least a threshold velocity.

The digital magazine application 136 retrieves 420 one or more content items associated with the identified content region. For example, an identifier associated with the identified content region is determined, and one or more content items associated with the identifier are retrieved 420. The content items may be retrieved 420 from the digital magazine server 140 or may be retrieved 420 from a storage device of the client device 130.

From the retrieved content items associated with the identified content region, the digital magazine application 136 identifies 425 one or more candidate content items for presentation to the user. Candidate content items may be identified 425 based on a variety of attributes associated with the content items. Examples of attributes associated with content items include, a title of a content item, an author of a content item, one or more topics associated with a content item, a type associated with a content item, a size of a content item, a source 110 associated with a content item, a time when a content item was created or published, an any other suitable information associated with a content item. For example, the digital magazine application 136 identifies 425 candidate content items based on one or more topics associated with the content items and a topic associated with the identified content region. As another example, the digital magazine application 136 identifies 425 candidate content items created or published within a specified time interval from a time when the interaction was received 410. In an additional example, candidate content items are identified 425 based on titles of content items and information presented in the identified content region.

One or more of the candidate content items are selected 430 by the digital magazine application 136 for presentation to the user. For example, the digital magazine application 136 selects 430 one or more of the candidate content items based on one or more attributes associated with the candidate content items. For example, the digital magazine application 136 selects 430 one or more of the candidate content items based on topics associated with the candidate content items, times the candidate content items were published or received by the digital magazine server 140, sources 110 associated with the candidate content items, titles of the candidate content items, or other information associated with the candidate content items. In one embodiment, the digital magazine application 136 ranks the candidate content items based on one or more attributes and selects 430 one or more of the candidate content items having at least a threshold position in the ranking or having highest positions in the ranking. As another example, candidate content items are clustered and a centroid of a cluster of candidate content items is compared to a vector describing content items currently displayed in the identified content region; candidate content items in a cluster having a highest measure of similarity to the vector describing the content items displayed in the identified content region or in a cluster having at least a threshold measure of similarity to the vector describing the content items displayed in the identified content region are selected 430. Selection of content items based on clustering of content items is further described in U.S. patent application Ser. No. 14/164,089, filed on Jan. 24, 2014, which is incorporated by reference herein in its entirety.

The digital magazine application 136 modifies 435 the identified content region and presents 440 one or more of the selected candidate content items in the modified content region. In some embodiments, the digital magazine application 136 modifies 435 the identified content region and one or more additional content regions, such as content regions adjacent to the identified content region. For example, the digital magazine application 136 resizes the identified content region and presents the selected candidate content items or information describing the candidate content items (e.g., titles, summaries, etc.) in the resized identified content region. As another example, the digital magazine application 136 determines dimensions of the identified content region and determines dimensions of the display device 132; based on the dimensions of the identified content region and the dimensions of the display device 132 the digital magazine application 136 increases the dimensions of the identified content region so that the identified content region is more prominently presented on the display device 132. The digital magazine application 136 may resize the identified content region using a ratio based at least in part on the dimensions of the display device 132. For example, the digital magazine application 136 increases a height and a width of the identified content region by amounts based on a ratio of a height of the display device 132 to a width of the display device 132 to maintain an aspect ratio of the identified content region after it is modified. Similarly, the digital magazine application 136 may reduce one or more dimensions of content regions adjacent to the identified content region to further distinguish the identified content region. Additionally, the digital magazine application 136 may also reposition the identified content region to occupy a more visible area of the display device 132 (e.g., a central location of the display device 132) by associating a modified location along the width of the display device 132 or a modified location along the length of the display device 132 with the identified content region.

In one embodiment, the digital magazine application 136 presents 440 titles, images, or other information identifying the selected candidate content items in the modified identified content region. For example, the digital magazine application 136 associates different portions of the modified identified content region with different selected candidate content items and presents information identifying different selected candidate content items in different portions of the modified identified content region. In some embodiments, the digital magazine application 136 retrieves a title and an image associated with each selected candidate content item and presents the title and the image of different selected candidate content items in different portions of the modified identified content region. For example, the digital magazine application 136 selects an image associated with a selected candidate content item and overlays text associated with a title of the selected candidate content item on the image. In some embodiments, the digital magazine application 136 presents 440 a preview, or a summary, of a selected candidate content item in the modified identified content region if the digital magazine application 136 determines that the pointer is positioned at a location of the display device 132 presenting the portion of the modified identified content region associated with the candidate content item and is within a threshold distance from the surface of the display device 132 for at least a threshold period of time. In various embodiments, the preview of the candidate content item is a subset of the content included in the candidate content item; for example, a preview of a candidate content item is a subset of text included in the candidate content item, is a subset of image included in the candidate content item, is an image and a tile associated with the candidate content item, or is any other suitable information from the candidate content item. The threshold distance from the surface of the display device 132 for the pointer to display the preview or summary of a selected candidate content item presented 440 in the modified identified content region may differ from the threshold distance from the surface of the display device 132 that identifies an interaction with the content region. For example, after receiving 410 an interaction with a content region, if the pointer is within an additional threshold distance of a location associated with a selected candidate content item presented in the modified identified content region, a preview of the selected candidate content item is presented.

Hence, the digital magazine application 136 may determine that the pointer is positioned at a location along a width of the display device 132 and a location along a length of the display device 132 corresponding to presentation of a selected candidate content item and that the pointer is within a threshold distance from the surface of the display device 132 for a threshold period of time, so the digital magazine application 136 presents a preview of the candidate content item to the user. A preview may include, text, images or portions of the candidate content item for display to the user. The modified content region may be further modified to include the preview of the selected candidate content item. Alternatively, a portion of the display device 132 is modified to include the preview of the selected candidate content item. In another implementation, a page template used to display content is modified to include an additional content region including the preview of the selected candidate content item.

In other embodiments, if an interaction with a portion of the display device 132 presenting the modified identified content region is received, a candidate content item associated with a portion of the modified identified content region presented in the portion of the display device 132 is retrieved and presented by the display device 132. As described above, the interaction with the portion of the display device 132 is based at least in part on a distance between a pointer associated with the user and the surface of the display device. For example, the interaction is received when the pointer is within a threshold distance of the surface of the portion of the display device 132 presenting the modified identified content region for at least a threshold time interval. As another example, the interaction is received when the pointer approaches the surface of the display device 132 presenting the modified identified content region with at least a threshold velocity. The threshold time interval or threshold velocity may differ than the threshold time interval or threshold velocity used to identify the content region. In some embodiments, after retrieving the candidate content item associated with the portion of the modified identified content region, the retrieved candidate content item is presented within the modified identified content region. Alternatively, the content presented via the display device 132 is modified to present the retrieved candidate content item rather than the content regions. However, in other embodiments, the retrieved candidate content item is presented via any suitable format. Additionally, a preview of a candidate content item may be presented by the display device 132 when an interaction with the portion of the display device 132 presenting a portion of the modified identified content region associated with the candidate content item is received, and the candidate content item is subsequently presented when an interaction with the preview of the candidate content item is received. The interaction with the preview of the candidate content item may be based at least in part on the distance between the pointer associated with the user and the surface of the display device 132, as further described above. While the preceding embodiments identify an interaction based at least in part on the distance between the pointer associated with the user and the surface of the display device 132, in alternative embodiments, the interactions are identified based at least in part on the distance between the pointer associated with the user and a surface of an input device 134 of the client device 110.

In one embodiment, the digital magazine application 136 modifies one or more content regions adjacent to the identified content region when modifying 435 the identified content region. For example, as the identified content region is resized to present 440 information describing one or more of the selected candidate content items, content regions adjacent to the modified identified content region are resized to prevent them from obscuring the modified identified content region. In one example, the digital magazine application 136 determines the dimensions of the modified identified content region and the dimensions of the display device 132. Based on the dimensions of the modified content region and the dimensions of the display device 132, the digital magazine application 136 resizes one or more of the content regions adjacent to the modified identified content region.

The modified identified content region is presented to the user via the display device 132 of the client device 110. In some embodiment, modified content regions adjacent to the modified identified content region are also presented to the user via the display device 132. In one example, the digital magazine application 136 presents the modified identified content region in a foreground while presenting other content regions in a background to visually distinguish the modified identified content region from other content regions. As another example, the digital magazine application blurs or darkens content regions adjacent to the modified identified content region to visually distinguish the modified identified content region from its adjacent content regions. In some embodiments, portions of content regions adjacent to the modified identified content region are obscured by the modified identified content region.

Figure 5:
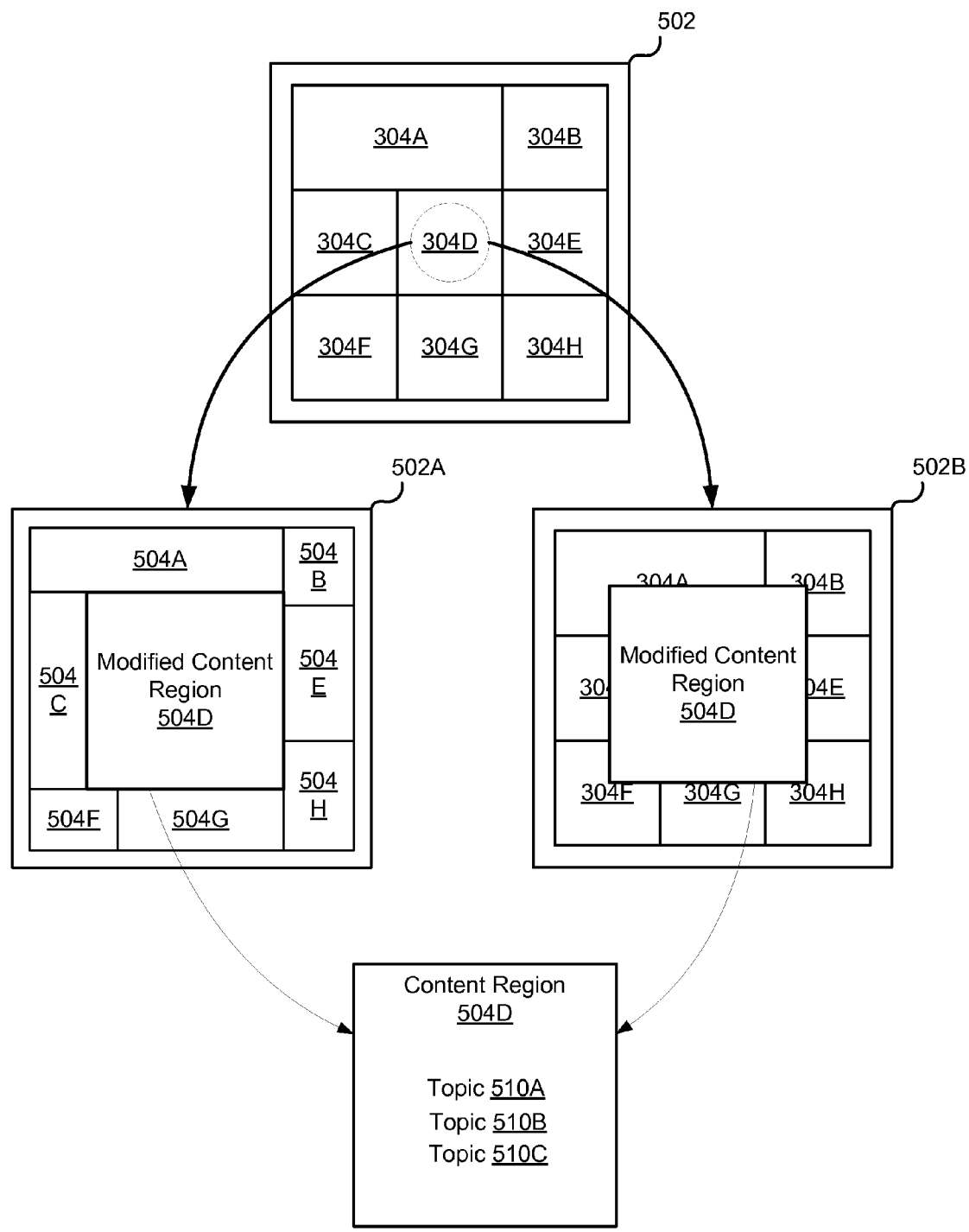
FIG. 5 illustrates examples of modifying a content region based on user interaction with the content region, in accordance with an embodiment of the invention.

FIG. 5 illustrates examples of modifying a content region based on user interaction with the content region. In the examples of FIG. 5, a digital magazine application 136 displays a page 502 of a digital magazine including content regions 304A-304H based on a page template. A user interacts with a location of a display device 132 presenting the page 502 that corresponds to content region 304D. For example, the user positions a pointer (e.g., a stylus, the user's finger) within a threshold distance of a surface of the display device 132 for at least a threshold period of time at a location along the width and along the length of the display device 132 where content regions 304D is presented, as described above in conjunction with FIG. 4.

Having determined that the user is interacting with content region 304D, the digital magazine application 136 retrieves content items associated with content region 304D, identifies candidate content items from the retrieved content item, and selects one or more candidate content items from the retrieved content items, as described above in conjunction with FIG. 4. The digital magazine application 136 modifies content region 304D to distinguish content region 304 from content regions 304A, 304B, 304C, 304E, 304F, 304G, 304H. In FIG. 5, page 502A modifies content region 304D to generate modified content region 504D, which is increased in size from content region 304D. Page 504A also reduces one or more dimensions of each of content regions 304A, 304B, 304C, 304E, 304F, 304G, 304H into modified content regions 504A, 504B, 504C, 504E, 504F, 504G, 504H to further distinguish modified content region 504D. The modified content regions 304 are presented to the user.

In page 502B, content region 304D is also modified to generate modified content region 504D, while dimensions of content regions 304A, 304B, 304C, 304E, 304F, 304G, 304H are not modified. However, modified content region 504D is visually distinguished from content regions 304A, 304B, 304C, 304E, 304F, 304G, 304H in page 502B. In the example of FIG. 5, modified content regions 504D obscures portions of content regions 304A, 304B, 304C, 304E, 304F, 304G, 304H, so modified content region 504D is presented in a foreground position, while content regions 304A, 304B, 304C, 304E, 304F, 304G, 304H are presented in a background position. However, in other implementations, modified content region 504D may be visually distinguished from content regions 304A, 304B, 304C, 304E, 304F, 304G, 304H using any suitable method.

Further, modified content region 504D may be modified to include topics or titles associated with the selected candidate content items associated with content region 304D. In this example, modified content region 504D includes selected topics 510A, 510B and 510C (collectively referred to using reference number 510). The digital magazine application 136 may select an image associated with a candidate content item and overlay text associated with the selected topics 510, to include in the modified content region 504D and present to the user. In other embodiment, any suitable information describing one or more of the selected candidate content items may be presented in the modified content region 504D. In one example, the user may reposition the pointer to a location of the display device associated with a topic 510 presented in modified content region 510, causing the digital magazine application 136 to present a preview of the content item associated with the topic 510, a summary of the content item associated with the topic 510, a subset of information from the content item associated with the topic 510, or any suitable information associated with the content item associated with the topic 510. Presentation of a preview of a content item presented in a modified content region is further described above in conjunction with FIG. 4.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for modifying content items from a digital magazine server to a user of the digital magazine server comprising:
    receiving one or more content items and instructions for displaying the content items on a client device in positions relative to each other to a user of a digital magazine server from the digital magazine server;
    displaying the one or more content items in content regions of a display device included on the client device positioned relative to each other based on the instructions received from the digital magazine server, each content region including one or more of the content items;
    receiving an interaction from the user with a portion of the display device, the interaction having at least a threshold rate of a change in a distance between a pointer associated with the user and a surface of the display device;
    identifying a content region presented in the portion of the display device;
    retrieving the one or more content items included in the identified content region;
    identifying one or more candidate content items from the one or more content items included in the identified content region;
    selecting one or more of the candidate content items based at least in part on attributes of the candidate content items;
    modifying the identified content region and modifying dimensions of one or more content regions adjacent to the identified region based on dimensions of the identified content region and dimensions of the display device while obscuring at least a portion of the content items displayed in the one or more content regions adjacent to the identified region;
    presenting information associated with one or more of the selected candidate content items in the modified identified content region;
    receiving an additional interaction from the user with a portion of the display device presenting the modified identified content region, the additional interaction having at least an additional threshold rate of change in the distance between the pointer associated with the user and the surface of the display device, the additional threshold rate of change different from the threshold rate of change;
    identifying a selected candidate content item associated with the content region presented in the portion of the display device presenting the modified identified content region;
    retrieving a subset of content included in the identified selected candidate content item; and
    presenting the subset of content included in the identified selected candidate content item via the display device.

2. The method of claim 1, wherein receiving the interaction from the user with the portion of the display device comprises:
    determining the pointer associated with the user is less than a threshold distance from the surface of the display device.

3. The method of claim 1, wherein receiving the interaction from the user with the portion of the display device comprises:
    determining the pointer associated with the user is less than a threshold distance from the surface of the display device for at least a threshold length of time.

4. The method of claim 1, wherein modifying the identified content region comprises:
    increasing one or more dimensions of the identified content region.

5. The method of claim 4, wherein the one or more dimensions are increased based at least in part on a ratio determined at least in part on dimensions of the display device.

6. The method of claim 1, wherein modifying the identified content region comprises:
reducing one or more dimensions of the additional content regions presented adjacent to the identified content region.

7. The method of claim 1, wherein modifying the identified content region comprises:
reducing one or more dimensions of the additional content regions presented adjacent to the identified content region; and
increasing one or more dimensions of the identified content region.

8. The method of claim 1, wherein modifying the identified content region comprises:
repositioning the identified content region for presentation in an alternative portion of the display device.

9. A computer program product comprising a non-transitory computer-readable storage medium containing instructions that, when executed by a processor, cause the processor to:
receive one or more content items from a digital magazine server and instructions for displaying the content items on a client device to a user of a digital magazine server;
display the one or more content items in content regions of a display device included on the client device, each content region including one or more of the content items;
receive an interaction from the user with a portion of the display device, the interaction having at least a threshold rate of a change in a distance between a pointer associated with the user and a surface of the display device;
identify a content region presented in the portion of the display device;
retrieve the one or more content items included in the identified content region;
identify one or more candidate content items from the one or more content items included in the identified content region;
select one or more of the candidate content items based at least in part on attributes of the candidate content items;
modify the identified content region and modify dimensions of one or more content regions adjacent to the identified region based on dimensions of the identified content region and dimensions of the display device while obscuring at least a portion of the content items displayed in the one or more content regions adjacent to the identified region;
present information associated with one or more of the selected candidate content items in the modified identified content region;
receive an additional interaction from the user with a portion of the display device presenting the modified identified content region, the additional interaction having at least an additional threshold rate of change in the distance between the pointer associated with the user and the surface of the display device, the additional threshold rate of change different from the threshold rate of change;
identify a selected candidate content item associated with the content region presented in the portion of the display device presenting the modified identified content region;
retrieve a subset of content included in the identified selected candidate content item; and
present the subset of content included in the identified selected candidate content item via the display device.

10. The computer program product of claim 9, wherein receive the interaction from the user with the portion of the display device comprises:
determine the pointer associated with the user is less than a threshold distance from the surface of the display device for at least a threshold length of time.

11. The computer program product of claim 9, wherein modify the identified content region comprises:
increase one or more dimensions of the identified content region.

12. The computer program product of claim 11, wherein the one or more dimensions are increased based at least in part on a ratio determined at least in part on dimensions of the display device.

13. The computer program product of claim 9, wherein modify the identified content region comprises:
reduce one or more dimensions of the additional content regions presented adjacent to the identified content region.

14. The computer program product of claim 9, wherein modify the identified content region comprises:
reduce one or more dimensions of the additional content regions presented adjacent to the identified content region; and
increasing one or more dimensions of the identified content region.

* * * * *